United States Patent
Abreu et al.

(10) Patent No.: US 11,544,715 B2
(45) Date of Patent: Jan. 3, 2023

(54) SELF LEARNING MACHINE LEARNING TRANSACTION SCORES ADJUSTMENT VIA NORMALIZATION THEREOF ACCOUNTING FOR UNDERLYING TRANSACTION SCORE BASES

(71) Applicant: Socure, Inc., New York, NY (US)

(72) Inventors: Pablo Ysrrael Abreu, Miami Beach, FL (US); Omar Gutierrez, New York, NY (US); Ali Haddad, New York, NY (US); Stansilav Palatnik, New York, NY (US); Lukas Dylan Osborne, New York, NY (US)

(73) Assignee: Socure, Inc., New York, NY (US)

( * ) Notice: Subject to any disclaimer, the term of this patent is extended or adjusted under 35 U.S.C. 154(b) by 0 days.

(21) Appl. No.: 17/687,827

(22) Filed: Mar. 7, 2022

(65) Prior Publication Data
US 2022/0327542 A1    Oct. 13, 2022

Related U.S. Application Data

(63) Continuation-in-part of application No. 17/227,832, filed on Apr. 12, 2021, now Pat. No. 11,270,230.

(51) Int. Cl.
*G06Q 20/40* (2012.01)
(52) U.S. Cl.
CPC ................ *G06Q 20/4016* (2013.01)
(58) Field of Classification Search
None
See application file for complete search history.

(56) References Cited

U.S. PATENT DOCUMENTS

| | | |
|---|---|---|
| 7,686,214 B1 | 3/2010 | Shao et al. |
| 9,686,275 B2 | 6/2017 | Chari et al. |
| 10,217,178 B2 | 2/2019 | Verley |
| 10,257,181 B1 | 4/2019 | Sherif et al. |
| 10,459,827 B1 | 10/2019 | Aghdaie et al. |
| 10,462,080 B1 | 10/2019 | Jones et al. |
| 10,581,851 B1 | 3/2020 | File et al. |
| 10,984,423 B2 | 4/2021 | Adjaoute |
| 2010/0049987 A1 | 2/2010 | Ettorre et al. |
| 2010/0293094 A1 | 11/2010 | Kolkowitz et al. |
| 2011/0035788 A1 | 2/2011 | White et al. |
| 2011/0047040 A1 | 2/2011 | Carlson et al. |
| 2011/0211735 A1 | 9/2011 | Langley |
| 2014/0058763 A1 | 2/2014 | Zizzamia et al. |
| 2015/0161232 A1 | 6/2015 | Kosko et al. |

(Continued)

FOREIGN PATENT DOCUMENTS

| | | |
|---|---|---|
| WO | 2018222959 A1 | 12/2018 |
| WO | 2020124037 A1 | 6/2020 |

OTHER PUBLICATIONS

Chandola et al., "Anomaly Detection: A Survey," ACM Computing Surveys, vol. 41, No. 3, Article 15, Jul. 2009.

(Continued)

*Primary Examiner* — Vincent Gonzales
(74) *Attorney, Agent, or Firm* — Charles B. Lobsenz; Brian H. Buck; Potomac Law Gorup, PLLC

(57) ABSTRACT

Provided are a system and methodology for iteratively transforming data, as between multiple sets thereof, that account for underlying data generation sources and bases. Doing so, via normalization of the data, enables uniformity of interpretation and presentation of the data no matter the machine learning model that produced the data.

27 Claims, 13 Drawing Sheets

(56) References Cited

U.S. PATENT DOCUMENTS

| | | |
|---|---|---|
| 2016/0127319 A1 | 5/2016 | Xiong et al. |
| 2017/0032277 A1 | 2/2017 | Klinger et al. |
| 2017/0099200 A1 | 4/2017 | Ellenbogen et al. |
| 2017/0148027 A1 | 5/2017 | Yu et al. |
| 2017/0230402 A1 | 8/2017 | Greenspan et al. |
| 2018/0046939 A1 | 2/2018 | Meron et al. |
| 2018/0130006 A1 | 5/2018 | Adjaoute |
| 2018/0316665 A1 | 11/2018 | Caldera et al. |
| 2018/0350006 A1 | 12/2018 | Agrawal et al. |
| 2019/0042887 A1 | 2/2019 | Nguyen et al. |
| 2019/0138512 A1 | 5/2019 | Pourmohammad et al. |
| 2019/0228419 A1 | 7/2019 | Sampath |
| 2019/0294786 A1 | 9/2019 | Villavicencio et al. |
| 2019/0342276 A1 | 11/2019 | Sherif et al. |
| 2020/0034852 A1 | 1/2020 | Lim |
| 2020/0184017 A1 | 6/2020 | Batra et al. |
| 2020/0226606 A1 | 7/2020 | Du et al. |
| 2020/0366699 A1 | 11/2020 | Sampaio et al. |
| 2020/0402058 A1 | 12/2020 | Zhou et al. |
| 2021/0097543 A1 | 4/2021 | Jia et al. |

OTHER PUBLICATIONS

Goldstein et al., "Histogram-based Outlier Score (HBOS): A fast Unsupervised Anomaly Detection Algorithm," Poster and Demo Track of the 35th German Conference on Artificial Intelligence (KI-2012), pp. 59-63, 2012.

International Search Report and Written Opinion issued in application No. PCT/US2021/039531 dated Oct. 6, 2021.

International Search Report issued in application No. PCT/US2021/039540 dated Oct. 15, 2021.

Lata et al., "A Comprehensive Survey of Fraud Detection Techniques," International Journal of Applied Information Systems, vol. 10, No. 2, pp. 26-32, Dec. 2015.

Extended European Search Report issued in application No. EP22167990.5 dated Sep. 9, 2022.

```
{
  "referenceId": "fc1f83e7-2554-4ba8-8fe9-a8224148d2e7",
  "fraud": {
    "reasonCodes": [
      "1610",
      "1626",
      "1705",
      "1609",
      "1553",
      "1611",
      "1121",
      "1614",
      "1556",
      "1630",
      "1708",
      "1618",
      "1555",
      "1707",
      "1602"
    ],
    "scores": [
      {
        "name": "sigma",
        "version": "1.0",
        "score": 0.1867
      }
    ]
  }
}
```

- Unique Identifier
- Intelligent Reason Codes to Justify Score: 500<= Email, 600<=Phone, 700<=Address.
- Machine Learning Model Output ranging 0 to <1. The closer to one the more likely the applicant will commit identity fraud.

FIG. 3

| ReferenceID | InitialDecision | FinalDecision | Fraud Indicator | FraudReportedDate | FraudType |
|---|---|---|---|---|---|
| 1 | Auto Approve | Approve | 1 | 20201015 | Confirmed |
| 2 | Auto Approve | Approve | 0 | | N/A |
| 3 | Auto Approve | Approve | 0 | | N/A |
| 4 | Manual Review | Reject | 1 | | Suspected Fraud |
| 5 | Auto Approve | Approve | 1 | 20201028 | Confirmed Fraud |

FIG. 5

| Client 1 | | Client 2 | | Client 3 | | Client 4 | |
|---|---|---|---|---|---|---|---|
| Data Score | Bin | Data Score | Bin | Data Score | Bin | Data Score | Bin |
| 0.0376 | 0 | 0.0119 | 0 | 0.0722 | 0 | 0.0445 | 0 |
| 0.1262 | 0 | 0.0817 | 0 | 0.1117 | 0 | 0.0524 | 0 |
| 0.1384 | 0 | 0.0891 | 0 | 0.1588 | 0 | 0.0671 | 0 |
| 0.139 | 0 | 0.098 | 0 | 0.1784 | 0 | 0.0955 | 0 |
| 0.211 | 0.2 | 0.1247 | 0.2 | 0.2295 | 0.2 | 0.1089 | 0.2 |
| 0.2343 | 0.2 | 0.1519 | 0.2 | 0.2593 | 0.2 | 0.1533 | 0.2 |
| 0.2755 | 0.2 | 0.177 | 0.2 | 0.2676 | 0.2 | 0.2697 | 0.2 |
| 0.3133 | 0.2 | 0.1866 | 0.2 | 0.3641 | 0.2 | 0.392 | 0.2 |
| 0.3426 | 0.4 | 0.2913 | 0.4 | 0.385 | 0.4 | 0.392 | 0.4 |
| 0.4405 | 0.4 | 0.3095 | 0.4 | 0.48 | 0.4 | 0.4382 | 0.4 |
| 0.6133 | 0.4 | 0.3582 | 0.4 | 0.561 | 0.4 | 0.482 | 0.4 |
| 0.6136 | 0.4 | 0.3824 | 0.4 | 0.6033 | 0.4 | 0.5074 | 0.4 |
| 0.6926 | 0.6 | 0.4034 | 0.6 | 0.6203 | 0.6 | 0.5267 | 0.6 |
| 0.7127 | 0.6 | 0.5914 | 0.6 | 0.6238 | 0.6 | 0.5319 | 0.6 |
| 0.7689 | 0.6 | 0.6563 | 0.6 | 0.6253 | 0.6 | 0.5509 | 0.6 |
| 0.7937 | 0.6 | 0.8028 | 0.6 | 0.6855 | 0.6 | 0.7878 | 0.6 |
| 0.8288 | 0.8 | 0.873 | 0.8 | 0.7802 | 0.8 | 0.791 | 0.8 |
| 0.8819 | 0.8 | 0.8879 | 0.8 | 0.8028 | 0.8 | 0.8366 | 0.8 |
| 0.8942 | 0.8 | 0.9163 | 0.8 | 0.8617 | 0.8 | 0.8951 | 0.8 |
| 0.9497 | 0.8 | 0.9572 | 0.8 | 0.912 | 0.8 | 0.9321 | 0.8 |

FIG. 8

| Client 1 | | Client 2 | | Client 3 | | Client 4 | |
|---|---|---|---|---|---|---|---|
| Bin | Lower Bound | Bin | Lower Bound | Bin | Lower Bound | Bin | Lower Bound |
| 0 | 0.0376 | 0 | 0.0119 | 0 | 0.0722 | 0 | 0.0445 |
| 0.2 | 0.211 | 0.2 | 0.1247 | 0.2 | 0.2295 | 0.2 | 0.1089 |
| 0.4 | 0.3426 | 0.4 | 0.2913 | 0.4 | 0.385 | 0.4 | 0.392 |
| 0.6 | 0.6928 | 0.6 | 0.4004 | 0.6 | 0.6203 | 0.6 | 0.5267 |
| 0.8 | 0.8288 | 0.8 | 0.873 | 0.8 | 0.7002 | 0.8 | 0.791 |

| Client 1 | | Client 2 | | Client 3 | | Client 4 | |
|---|---|---|---|---|---|---|---|
| Bin | Lower Bound | Bin | Lower Bound | bin | Lower Bound | Bin | Lower Bound |
| 0 | 0.0376 | 0 | 0.0119 | 0 | 0.0722 | 0 | 0.0445 |
| 0.2 | 0.211 | 0.2 | 0.1247 | 0.2 | 0.2295 | 0.2 | 0.1089 |
| 0.4 | 0.3428 | 0.4 | 0.2913 | 0.4 | 0.385 | 0.4 | 0.392 |
| 0.6 | 0.6926 | 0.6 | 0.4004 | 0.6 | 0.6203 | 0.6 | 0.5267 |
| 0.8 | 0.8288 | 0.8 | 0.873 | 0.8 | 0.7002 | 0.8 | 0.791 |

FIG. 10B

| Iteration 1 | |
|---|---|
| Bin | Aggregate Lower Bound |
| 0 | 0.04155 |
| 0.2 | 0.168525 |
| 0.4 | 0.352725 |
| 0.6 | 0.56 |
| 0.8 | 0.79825 | ns
SELF LEARNING MACHINE LEARNING TRANSACTION SCORES ADJUSTMENT VIA NORMALIZATION THEREOF ACCOUNTING FOR UNDERLYING TRANSACTION SCORE BASES

CROSS-REFERENCE TO RELATED APPLICATION

This is a continuation-in-part application of application Ser. No. 17/227,832, filed Apr. 12, 2021, the entire contents of which are incorporated by reference herein.

FIELD OF THE INVENTION

The present invention is directed generally to systems and methodologies associated with enabling binary decision making including when detecting and reporting identity fraud, and, more particularly to systems and methodologies which employ machine learning to adjust fraud scoring scenarios generated by one or more machine learning models for underlying scores bases to a normalized representation of such scenarios independently of a given machine learning model type.

BACKGROUND OF THE INVENTION

In today's business environment, almost all businesses have an online presence. It's also very likely that these businesses permit their customers to conduct transactions online. These transactions almost always involve either a financial component or otherwise require a trust based element. For example, when some form of currency is being used by a customer to purchase a good or a service, it is critical to ensure that the person (or machine) initiating and conducting the transaction is who they say they are. This is important to ensure that the form of payment (e.g. credit card) is authorized for use by the purported purchaser.

If it turns out that this is not the case, then a variety of undesirable results can occur. This can include, but is not limited to, chargebacks and other revenue losses. Even when there is no financial component to a transaction, negative consequences can still result if the user on the other end of the transaction is not who they say they are. For example, businesses may offer other types of online services which provide access to data/content/information, access to sensitive systems or resources, the ability to conduct non-financial transactions impacting the operation of the business as well as other rights and abilities which are intended to be limited only to authorized persons or entities. For obvious reasons, it is very important to do whatever is possible to ensure that the person, entity or machine seeking to conduct these types of interactions are who they say they are and that the purported activity is not fraudulent.

Various fraud detection and identity verification methodologies and related systems for implementing the same exist. While these offerings are generally helpful and effective, they tend to become less so over time and there exists a need for novel approaches to the problem of verifying identities and preventing fraud in connection with online activities. This need exists as online fraud becomes more prevalent and more sophisticated due to the rapid advances in technology which are usually available to fraudsters.

In traditional approaches to fraud detection, static rules-based systems or models are employed and implemented in real time in connection with decision making associated with online transactions. However, these approaches suffer from a number of drawbacks. For one, the set of rules that make up the model require frequent updates to remain functional and effective. In a static rules-based system, these updates are generally made manually and there is often a lag between the time that a need for a new or changed rule is identified and the time that it is implemented. In other words, such static rules-based systems are unable to both immediately recognize bases for flaws in originally issued fraud decisions and immediately correct those flaws prior to issuance of subsequent decisions. This is especially the case since it can be extremely difficult for such manual updates to be timely implemented during the course of accommodating multiple (e.g., thousands) of requests for fraud decisions. Resultingly, less than ideal decisions can fail to appropriately identify occurrences of fraud.

These conventional systems are also very dependent on relatively expensive human effort. Risk analysts must be hired and deployed to identify fraud patterns and implement rules designed to protect against them. Similarly, when these large rule sets are created and managed by humans, they are subject to error and omissions due to their complexity as fraud patterns increase and number and complexity.

Other problems also arise with respect to existing fraud detection solutions. One such problem results from changing demographics due to societal trends. Many millennials as well as individuals falling into other age categories have limited data available which can be used in decision support regarding transactions that these individuals purport to make. This may be due to different attitudes with respect to banking relationships, the use of credit and other financial matters. With limited data available, it is much more difficult for existing models to generate high confidence fraud scores and, again, bad decision making can result.

Yet another concern associated with current fraud identification systems is the impact that they can have on the user experience. In some cases, the process can slow down the transaction and/or add additional confusion. This can result in abandonment of the transaction by the user and possibly loss of revenue and/or other negative impacts to the customer relationship specifically and/or the business in general. Online merchants and other businesses which conduct and offer online transactions are seeking a seamless experience where fraud identification activities occur in the background and are essentially invisible to the user.

Due to the inherent operational characteristics of existing systems, both false positives and false negatives which result from existing models can occur. This can result in preventing a transaction that should be permitted to occur or permitting a transaction to occur when it should not be permitted, respectively. Both situations are undesirable from a business perspective as well as from a customer relations standpoint.

One aspect of fraud prevention relates to the interpretation of fraud scoring generated by one or more machine learning models that may be implemented. That is, such interpretation is key to appropriate identification of fraud and to preventing instances thereof from arising when vetting transactions.

Factors that may impact the interpretation of output generated among the one or more machine learning models include bias drawn and rooted in a Prior Probability Distribution expressing a preformulated conception of whether fraud, for instance, may have occurred absent evidence of the same. Other factors may include a given type or implementation of the one or more machine learning models, including variability of their input(s) such as given, predetermined predictors and/or data sources.

In other words, as scoring is to be interpreted from one model to the next, representation(s) of that scoring, and thus the interpretation thereof, may shift so as skew utility of the scoring generated from machine learning.

Thus, it would be desirable to evolve the interpretation of machine learned data to encompass versatility of input such that as that input is processed from one model to the next uniformity of generated scoring for underlying scores bases may be achieved and easily understood by a recipient.

SUMMARY OF THE INVENTION

It is to be understood that both the following summary and the detailed description are exemplary and explanatory and are intended to provide further explanation of the present invention as claimed. Neither the summary nor the description that follows is intended to define or limit the scope of the present invention to the particular features mentioned in the summary or in the description. Rather, the scope of the present invention is defined by the appended claims.

Embodiments may include a system and method for iteratively transforming transaction scores data to detect one or more fraudulent transactions from among transactions corresponding to received transaction data therefor, including a physical storage and one or more processors for executing instructions being stored within the physical storage and including at least a first instruction of the instructions defining an ingestor operative to receive a first set of the transaction scores data corresponding to a plurality of entities, at least a second instruction of the instructions defining a compiler operative to sort the first set of transaction scores data into a plurality of bins, at least a third instruction of the instructions defining an aggregator operative to identify a lowest magnitude portion of the first set of transaction scores data corresponding to each of the plurality of entities and each bin of the plurality of bins, and form the lowest magnitude portions of the first set of transaction scores data as a second set of the transaction scores data defining a normalization of the first set of transaction scores data, and at least a fourth instruction of the instructions defining a mapper configured to map the second set of transaction scores data to each bin of the plurality of bins. In the embodiments, the first set of transaction scores data may be based on an application of a first rules base to the received transaction data, in response to the application of the first rules base, as against an application of a second rules base to the received transaction data, generating a highest correspondence between the first set of transaction scores data and feedback for the received transaction data. Also in the embodiments, the transaction scores data of the first and second sets of transaction scores data may define a scoring of the received transaction data comprising a correlation to a probability of fraud as to one or more of the transactions corresponding to the received transaction data. Additionally in the embodiments, each of the first and second sets of transaction scores data may be automatically generated, in sequence, for each of one or more iterations of the received transaction data corresponding to one or more of the plurality of entities.

Another embodiment may include a system for iteratively transforming transaction scores data to detect one or more fraudulent transactions from among transactions corresponding to received transaction data therefor, including a physical storage and one or more processors for executing instructions being stored within the physical storage and including generating an active rules base, scoring the received transaction data according to the active rules base to define the transaction scores data, receiving a first set of the transaction scores data corresponding to a plurality of entities, generating a second set of the transaction scores data based on a normalization of lowest magnitude portions of the first set of the transaction scores data, and mapping the second set of the transaction scores to bins corresponding to the first set of the transaction scores data. In the embodiment, each of the first and second sets of transaction scores data may be automatically generated, in sequence, for each of one or more iterations of the received transaction data corresponding to one or more of the plurality of entities.

BRIEF DESCRIPTION OF THE DRAWINGS

FIG. 3 is a view of an exemplary data set associate with a fraud score response provided to a client in one embodiment of the present invention;

FIG. 5 is an exemplary feedback data set as may be received by the system of the present invention from a client according to a preferred embodiment thereof;

FIG. 8 illustrates a chart of ingested data across a plurality of clients for a given industry wherein the data is sorted per a relevant bin normalization according to a magnitude of the data;

FIG. 9 illustrates a chart according to FIG. 8 in which corresponding ingested data for each client iteration is grouped to reflect a lowest magnitude score for each bin;

FIG. 10A illustrates a chart according to FIG. 9 in which the lowest magnitude score for each bin and across respective clients are readied for calculation of an averaged aggregate lowest magnitude score, per bin, in a respective iteration;

FIG. 10B illustrates a chart, in accordance with FIG. 10A, of the calculated averaged aggregate lowest magnitude score, per bin, in the respective iteration;

DETAILED DESCRIPTION OF THE INVENTION

Figure 1:
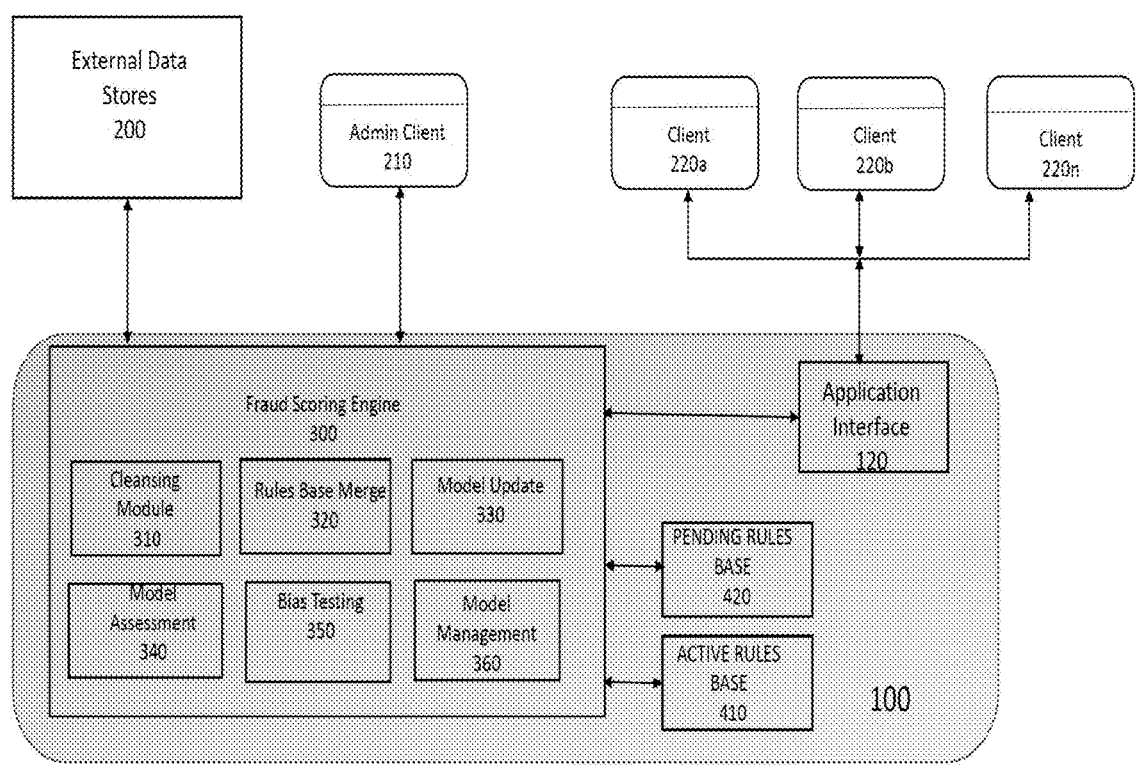
FIG. 1 is a diagram depicting the major components of the system of the present invention including various elements with which the system of the present invention may interact in preferred embodiments thereof.

The present disclosure will now be described in terms of various exemplary embodiments. This specification discloses one or more embodiments that incorporate features of the present embodiments. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. The skilled artisan will appreciate that a particular feature, structure, or characteristic described in connection with one embodiment is not necessarily limited to that embodiment but typically has relevance and applicability to one or more other embodiments.

In the several figures, like reference numerals may be used for like elements having like functions even in different drawings. The embodiments described, and their detailed construction and elements, are merely provided to assist in a comprehensive understanding of the present embodiments. Thus, it is apparent that the present embodiments can be carried out in a variety of ways, and does not require any of the specific features described herein. Also, well-known functions or constructions are not described in detail since they would obscure the present embodiments with unnecessary detail.

The description is not to be taken in a limiting sense, but is made merely for the purpose of illustrating the general principles of the present embodiments, since the scope of the present embodiments are best defined by the appended claims.

It should also be noted that in some alternative implementations, the blocks in a flowchart, the communications in a sequence-diagram, the states in a state-diagram, etc., may occur out of the orders illustrated in the figures. That is, the illustrated orders of the blocks/communications/states are not intended to be limiting. Rather, the illustrated blocks/communications/states may be reordered into any suitable order, and some of the blocks/communications/states could occur simultaneously.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

The word "exemplary" is used herein to mean "serving as an example, instance, or illustration." Any embodiment described herein as "exemplary" is not necessarily to be construed as preferred or advantageous over other embodiments. Additionally, all embodiments described herein should be considered exemplary unless otherwise stated.

With reference now to FIG. 1, the system of the present invention, in one preferred embodiment thereof, is now described. According to this preferred embodiment, fraud scoring system (FSS) 100 resides on a single cloud based server although it is also possible for various components of FSS 100 (as described herein) to reside on separate servers. By way of example, FSS 100 may be a computer implemented application which resides on a computing server.

FSS 100 preferably includes fraud scoring engine (FSE) 300, which itself is comprised of a number of modules as discussed further herein. FSE 300 operates to generated fraud scores based on received input. These fraud scores are generated in response to requests originating from clients 220*a*, 220*b* . . . 220*n*. FSS 100 may be accessed through the internet or any other private or public network by one or more clients 220.

Each of clients 220 may be personal computers, laptops, handheld computing devices such as smartphones or tablets or any other device capable of providing the required connectivity and display. In some embodiments, client 220 may be a computing application operated by a customer which requires fraud scoring data to process transaction requests. For example, client 220 may be an application or set of applications operated by a financial institution which processes requests for new credit cards made by customers of that financial institution. Herein, the terms "transaction," and "transaction request" can mean any event for which fraud can be detected via analysis and scoring of information used in connection with the event, and include, for example, an application for a business or other type of account opening, an application providing an account information update, an application for a credit check, any type of application for a background check or identity verification, an application for an employment check or verification, etc. That is, the subject information for which fraud may be detected can be information submitted during an initial stage (i.e., application stage) of an activity toward which an application is directed (e.g., account opening, employment, etc.) In these regards, for instance, it is contemplated that embodiments herein may be employed to detect submission of fraudulent information forming part of a transaction or a transaction request. For example, it is contemplated that embodiments herein can detect fraud for information submitted as part of any of the aforementioned applications such that the activity toward which an application is directed (e.g., an account opening) ought not to proceed.

Clients 220 interact with FSS 100 such that data may be communicated between them via application interface 120 and such that FSS 100 may process fraud score requests made by clients 220 with regard to one or more of the above types of applications made by individuals or entities such as organizations. Application interface 120 may comprise one or more application programming interfaces (APIs) that permit applications associated with client 220 to communicate with FSS 100.

Also shown in FIG. 1 is admin client 210. Admin client 210 may comprise a personal computers, laptops, handheld computing devices such as smartphones or tablets or any other similar device. Admin client 210 is operative to allow users to configure, maintain and support the operation of FSS 100. For example, a user may use admin client 210 to interact with FSS 100 to set parameters regarding what is required to invoke the transition from an active rules base to a pending rules base as discussed in further detail below.

External data stores 200 may also be present according to the teachings of the present invention. External data stores 200 may comprise one or more external databases, data sets, systems, applications, rules bases and/or other sources of data which is used by FSS 100 to generate fraud scores and/or to generate and/or update the rules bases used by FSS 100 as further described herein. By way of example, external data stores 200 may comprise credit reporting databases, demographic databases, reported and known fraud data, financial transaction data as well as other sources of data useful to FSS 100 in generating accurate fraud scores via rules based methodologies.

Returning now to the specific components of FSS 100, FSS 100 may include various components for generating fraud scores. In one embodiment, these components may include application interface 120 (described above), active rules base 410, pending rules base 420 and the various components of FSE 300. Each of these components and their associated functionality are more fully described below. In particular, active rules base 410 and pending rules base 420 may comprise one or more rules and/or conditions applicable to call data of FIG. 2 below, whereas such data serves as transaction data for a call requesting generation of a fraud score.

FSS 100 may reside on one or more physical servers. These servers may include electronic storage, one or more processors, and/or other components. The servers may also include communication lines, or ports to enable the exchange of information with a network and/or other computing platforms. The servers may include a plurality of hardware, software, and/or firmware components operating together to provide the functionality attributed herein to FSS 100.

Electronic storage associated with the servers may comprise non-transitory storage media that electronically stores information. The electronic storage media of electronic storage may include one or both of system storage that is provided integrally (i.e., substantially non-removable) with servers and/or removable storage that is removably connectable to the servers via, for example, a port or a drive. Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage may include one or more virtual storage resources (e.g., cloud storage, a virtual private network, and/or other virtual storage resources). Electronic storage may store software algorithms, information determined by processors, information received from servers, information received from clients 220, and/or other information that enables the servers to function as described herein.

While an exemplary architecture is described above, it will readily be understood by one of skill in the art, that an unlimited number of architectures and computing environments are possible while still remaining within the scope and spirit of the present invention.

Returning now to the specific components of FSS 100 shown in FIG. 1, FSE 300 includes various modules which are now generally described. The operation of each of these modules will be described in further detail below. In a preferred embodiment of the present invention, cleansing module 310 cleanses feedback data received from clients 220 such that variations in data format and classification can be normalized and used by FSE 300 to update one or more pending rules bases 420 to perform more effectively. While only one pending rules base 420 is shown in FIG. 1, in practice, multiple pending rules bases may exist as feedback data is received from various clients 220 and prior to the time that these pending rules bases are invoked as an active rules base 410.

Rules bases may be used generally or, in some cases, they may be broken down by customer by some other classification. For example, FSS 100 may function such that for customer 1 (e.g. BANK A), a specific active rules base 410 (Base #1) may be used for that customer to generate fraud scores in connection with new credit card request decisioning to be made by BANK A. Further, another active rules base 410 (Base #2) may be used for initial mortgage lending qualification decisioning to be made by BANK A. In connection with this, there may be one or more pending rules bases 420 associated with each of Base #1 and Base #2 which are continually being updated according to the teachings of the present invention based on feedback data and in accordance with the teachings of the present invention. At some point, and as more fully described herein, pending rules base 420 may be substituted for active rules base 410 to generate pending rules base 420 as the new active rules base 410.

This can occur with respect to each active rules base 410 in use by FSS 100 for the benefit of multiple different customers requesting fraud scores from FSS 100. Similarly, various other active rules base 410/pending rules base 420 pairs may exist for other customers (customers 2, 3 . . . n) and for each of their specific decisioning requirements.

Along these lines, it will be understood by one of skill in the art that feedback data received may come from a source which is different than the component or application which requests fraud scores. In other words, and for example, Bank A may request fraud scores via client 220*a* while feedback data coming from Bank A may be provided to FSS 100 by Bank A via client 220*a* or, alternatively via another client or another methodology such as a direct FTP transfer or some other known methodology for providing the relevant electronic data to FSS 100. Similarly, it will be understood by one of skill in the art that while feedback data from one customer (e.g. Bank A) may be used for the limited purpose of updating pending rules bases 420 used by that same customer (Bank A), it is also possible to employ feedback data from one customer (e.g. Bank A) to update pending rules bases 420 to be used by one or more other customers (e.g. Bank B, Lender C, etc.).

Returning now to the discussion of the other components of FSE 300, rules base merge 320 functions to merge new training sets developed in connection with feedback data with the existing rules already present in pending rules base 420. Model update module 330 then updates pending rules base 420 to create a new model reflecting the updated rules base. This updated model may contain new rules as well as rules which have been newly optimized based on the recently received training sets derived from the feedback data received from clients 220.

Model assessment module 340 then assesses the newly developed model resulting from model update 330. In a preferred embodiment this assessment comprises comparing the newly developed pending rules base 420 as against the currently in use active rules base 410 to determine whether the pending rules base 420 is statistically significantly improved over the current active rules base 410. Once this occurs, then, in some embodiments, bias testing module 350 is engaged to perform automated protected-class bias tests on the pending rules base 420 which may include tests against both the distribution and individual utilized predictors.

Assuming that the pending rules base 420 passes this bias testing, then model management module 360 operates to substitute the pending rules base 420 for the current active rules base 410 after which model management module will initiate one or more new pending rules bases 420 associated as the new active rules base 410 so that additional feedback data can be employed to continually update and optimize the relevant model as feedback data is received over time. In this regard, FSS 100 may employ a pending rules base 420 associated as a new active rules base 410 for transaction data and feedback data that has already been received in response to a request to re-score the transaction data. Model management module 360 may also function to alert the relevant client(s) 220 concerning a newly rolled out active rules base 410 as well as provide any information and/or documentation which is required or useful in connection with client's use of the model as it has been updated. In some embodiments, this information may also include new or different information regarding the type and/or format of feedback data which is required/desired in connection with client's use of the new model.

Figure 2:
FIG. 2 is a view of an exemplary data set associated with an fraud score request call received from a client in one embodiment of the present invention.

With reference now to FIGS. 2 and 3, exemplary call data and returned fraud score data, respectively, in one embodiment of the present invention, are provided. FIG. 2 shows exemplary data, including PII of an individual, that may be provided by client 220 to FSS 100 in connection with a request for a fraud score. In preferred embodiments, the format of these calls is specified via application interface 120 and client 220 is configured to provide data in this required format. In this example, the name, mobile phone number, physical address, IP address (of the computing device used by the customer in attempting the transaction), userid, national id, date of birth and email address are all passed to FSS 100 by client 220 in connection with the fraud score request. This personally identifiable information (PII) is used by FSS 100 to generate a fraud score using the rule based models available to it and as further discussed below.

FIG. 3 is an exemplary set of data returned to client 220 by FSS 100 following the completion of the fraud scoring process which is invoked by the client request. In this case, a referenceid is assigned to the request response. This referenceid is also used in connection with the novel feedback reporting and model updating process of the present invention. When feedback data is later reported to include those transactions which were ultimately fraudulent, this referenceid value is used to match the reported feedback data with the data generated and used by FSS 100 in originally conducting the fraud score analysis such that the rules in the model can be optimized as discussed in further detail below.

In preferred embodiments, the data returned by FSS 100 to client 220 may also include a fraud score indicative of the likelihood that the transaction will be fraudulent. In some embodiments, the score ranges from 0 to 1 and the higher the value, the more likely that the transaction is expected to be fraudulent. In some embodiments, the returned data may also include one or more reason codes (such as matching of email address, phone number and/or physical address and the like) which reflect the justification for the fraud score. These reason codes may tie to specific rules used in the model to arrive at the final reported fraud score.

Figure 4:
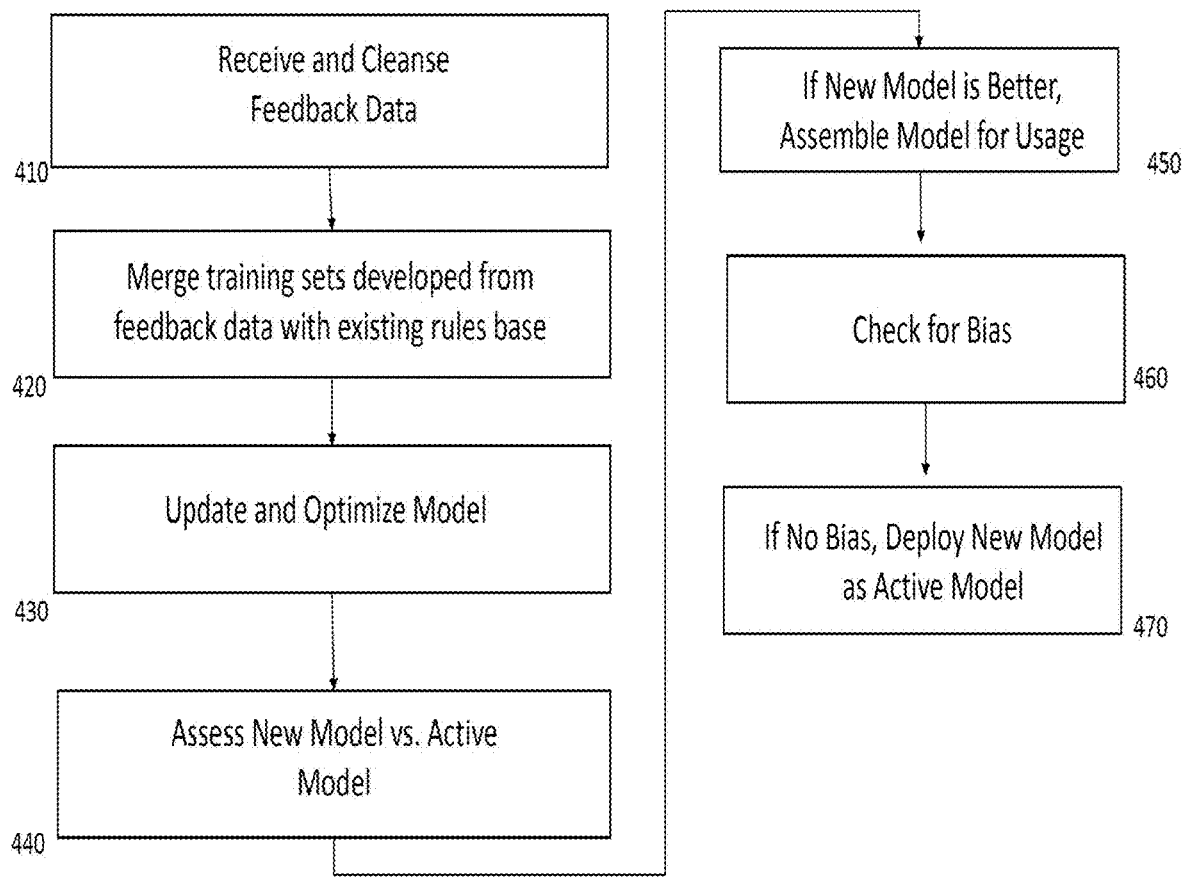
FIG. 4 is a flow chart describing the key steps involved in the process of generating fraud scores using machine learning based rules optimization according to the teachings of the present invention in preferred embodiments thereof.

Turning now to FIGS. 4 and 5, a flowchart describing the steps in the process of optimizing rules based models using feedback data as well as an exemplary set of feedback data, respectively, according to the teachings of the present invention, are provided. The discussion that follows is an exemplary process for using feedback data to optimize a model. In this discussion it is assumed that a single feedback data set is received from a single client 220 and further that the feedback data set is used to update a single model used on behalf of that client. As will be understood by one of skill in the art, the scope and spirit of the present invention is not necessarily limited thereto. For example, and as referenced above, more than one data set may be received at one time and may be applied to optimize one or more models.

As noted, it is also possible for feedback data sets received from one client 220 (representing use by Customer A) to be employed to optimize models used on behalf of other customers (e.g. Customer B) and/or for received feedback data sets to be used to optimize "universal" models which are employed on behalf of multiple customers which receive fraud scores and make binary decisions based thereupon. Similarly, while the discussion references receipt of feedback data from clients 220, the invention is not necessarily limited thereto in that feedback data can be provided to FSS 100 via any other means whereby an electronic data file is made available to FSS 100.

Beginning at step 410, FSS 100 receives feedback data from client 220. This feedback data is provided, in some embodiments, through application interface 120 which allows data to be formatted and shared with FSS 100 in a manner which is anticipated by FSS 100. In any event, although feedback data formatting requirements may be specified, often, the data may not be provided in exactly the format expected so at step 410, cleansing module 310 operates to clean and standardize the received feedback data. This may include, for example, renaming labels associated with data, standardizing data formatting and ensuring that the specific data received is matched with the specific class of data to which it is intended to apply.

During this step 410, cleansing module 310 may also operate to discard some or all of the feedback data received if it determines that there are material errors in the data and/or if data cannot be matched with expected data classifications. For example, if a series of transaction identity values are in a completely incorrect format, FSE 300, and in particular, cleansing module 310, may discard some or all of the data associated with those transactions or, alternatively, it may lessen the weight placed upon those transactions when those transactions are used in optimization as discussed below. The system of the present invention may also operate, in some embodiments, to discard some or all of the transactions reported as fraudulent if it is determined that the basis for fraud is likely to be something other than identity theft.

With reference now to FIG. 5, and to aid in the discussion, an exemplary feedback data set is provided. In one embodiment, cleansing module 310 will operate to ensure that feedback data is formatted such that the received data is matched with one of the columns of FIG. 5 and associated therewith. So, for example, cleansing module 310 will attempt to match some of the received data with the referenceid column. Preferably, when received from client 220, the correct data will be assigned to that label but even if there is a mislabeling in the data received from client 220, cleansing module 310 will operate to attempt to identify all data which should be associated with that column and associate it therewith.

At step 420, the newly received and cleansed feedback data is adapted to reflect training sets which can be used in later steps to update rules based on known outcomes. So, for example and with reference to the data set in FIG. 5, and in particular the first data row thereof (row with ReferenceID 1)) it is now known that this transaction turned out to be fraudulent (based on the "1" value in the Fraud Indicator column). Because this transaction was allowed to proceed based upon a generated fraud score in the past as well as a binary decision made based on that fraud score value, it is valuable to address the basis for the undesirable outcome—namely the generation of a fraud score that was determined to meet a threshold to allow the transaction to proceed, when, in fact, it shouldn't have been permitted to proceed. At this step, transactions such as these, including the reported feedback data associated with these transactions (e.g. the data in the FraudReportedDate and FraudType columns) are used to generate training sets which are, in turn, used to optimize the models as discussed below.

Next, at step 430, the received feedback data is used by rules base merge module 320 to supplement and optimize the pending rules base associated with the model. A model may have, for example, on the order of 5000 rules from which fraud scoring can be accomplished. From time to time, new rules may be added to the model and the feedback data can be used to "seed" outcomes for these new rules. In addition, the feedback data is also used with existing rules to optimize their performance outcomes. In other words, with the dependent variable being either an expected fraudulent transaction or an expectation that a transaction will NOT be fraudulent, and the independent variables being external data used to drive the value of the dependent variable (each a rule), the mapping relationship between each independent variable and the dependent variable is adjusted based on feedback received. That is, a value of a generated fraud score may fluctuate based upon a relative impact of the feedback on a given independent variable.

By way of example, assume that one rule in a model is "Requesting IP Address Location Distance from Home IP Address". This rule may be employed as one factor in generating a fraud score and may take into account how far the user is from their known home IP address when they attempt the transaction based on location of their computing device as reflected by their IP address. According to the teachings of the present invention, the mapping of this distance value to a component value of a fraud score may be updated through the use of the feedback data. In this case, and by way of example, the transaction in the first row of FIG. 5 could be used to "re-train" this rule.

Thus, FSE 300 maps the referenceid to recall all of the known independent variables at the time the original fraud score was generated. In this example, if the IP location distance mapping to the fraud score component generated a fraud score component that leans toward permitting the transaction to occur, this rule may now be adjusted in hindsight since it is now known that this transaction turned out to be fraudulent. This would occur if FSE 300, and in particular model update module 330, determines that this independent variable impacts the model outcome in a way that the mapping should be adjusted for this rule.

As the process continues, and during step 430, each rule in the model is considered for updating and is updated as required based upon the available feedback data. In some cases, existing rules are updated based upon the new known outcomes and a re-run of the model to assess the validity of the rule mapping for that existing rule. In other cases, new rules (e.g. new independent variables) have been selected for possible inclusion in the model and these new rules are backtested against previous transactions to develop an initial mapping.

As more and more feedback data is received, these new rules continue to be updated and optimized such that the mapping from independent variable to dependent variable outcome reflects a more accurate assessment based upon known data. In preferred embodiments of the present invention, FraudReportedDate data is used in this analysis such that more recently reported fraudulent transactions are given more weight in optimizing the applicable rules. Similarly, FraudType data may also be used in determining the weight and applicability for each of the fraudulent transactions and how they should be used to adjust the mapping for one or more rules in the model.

Next, at step 440, and now that a new development version of a model 420 has been created, the expected performance of this development model is measured against the known and expected performance of the active model 410. This function is performed by model assessment module 340 by re-running the fraud score analysis using both models and checking outcomes against reported fraud data received in connection with the feedback data. That is, transaction data corresponding to the feedback can be fed to both models. If it is determined that performance of the development version 420 is not statistically significantly better than the performance of the active model 410, then no change in the active model is made. That is, if it is determined that the performance of the development version 420 does not more accurately reflect the feedback data, then no change in the active model is made. Rather, FSS 100 continues to receive more feedback data and the model is continually updated over time until such time as the performance of the development version 420 IS statistically significantly better than the performance of the active model 410, such that the development version 420 more accurately reflects the feedback data. Here, the terms "statistically significantly improved" and "statistically significantly better" can mean meeting or exceeding a predetermined threshold (e.g., any percentage improvement in scoring reflecting feedback) such that the corresponding performance is a highest performance as between an active model 410 and a pending model 420. As such, the active model 410 can be maintained if the performance of the pending model 420 does not meet or exceed the threshold. Alternatively, if the performance of pending model 420 meets or exceeds the threshold with respect to previously received transaction data and corresponding feedback, the pending model 420 can be substituted for the active model 410.

Once performance of the pending model 420 meets or exceeds the predetermined threshold, the process continues to step 450 at which time the new model is assembled for usage in connection with one or more customers. Optionally, the process, at step 460, may then assess the newly developed model for inherent bias against one or more protected classes as may be required by law, regulation and/or policy. If bias is found at step 460 then the new model may be rejected as a potential active model and updating of the model may continue using feedback data until such time as bias testing is passed. In addition or alternatively, human intervention may be manually imposed to adjust the model to remove or reduce bias such that the model can be adapted as a new active model. That is, such intervention may be imposed prior to rejection of the new model in a case in which bias is found.

Finally, at step 470, FSE 330, under the control of model management module 360, will substitute the new pending model as the new active model if performance testing and bias testing allow. This step may also include automatically notifying one or more customers via clients 220 of the update to the model as well as providing any information that customers should know about the new model and/or updates to the required format for providing feedback data.

In some further embodiments of the present invention, other processing steps may also be implemented to optimize the accuracy of machine learning when generating one or more scoring regimes. These regimes are highly dependent on a training data dependent variable distribution, selected independent variables and the final chosen machine learning algorithm. When updating models in real-time, dependent variable distributions, independent variables and final machine learning algorithms will vary. This creates a challenge for those using the scores. For example, because of this variability, it may be difficult for a financial institution to make an educated binary decision whether to accept/decline financial applications.

One solution to this is for the system of the present invention to include a model scores normalization capability which assesses previous production distributions on a per client basis based on different timeframes/volume. The scores are then normalized based on mimicking previous models thus allowing clients to keep the very same established decisioning thresholds while using a new model which shows improved performance as a result of latest feedback and inclusion of new independent variables as is discussed above.

In other further embodiments of the present invention, a real time model recommender capability may be included. B2B businesses spend a significant amount of time to properly setup client's API accounts enabling the correct product and services needed to best serve clients. Furthermore, companies that provide the related scores do not necessarily know they are serving the best scores in real-time. For example, assume ModelX was built and optimized to receive the following identity inputs—(Name, SSN, DOB, Phone, Email and IP Address) and further CreditCard-Bank-A is passing all of the inputs used to optimize ModelX. Further assume that CreditCardBank-B is not passing the email address during real-time calls. As a result, we know that ModelX will not perform as expected so the best model to serve back in real-time is a model that is optimized on NOT using email address as an input. This problem thus results because the scoring systems are not serving the best possible score taking into consideration the real-time inputs.

In addressing this problem, the system of the present invention may include a real time model recommender functionality that takes into consideration real-time identity personally identifiable information (PII) inputs (e.g., street address, email address, phone number, credit card number, etc.), client metadata (Industry, fraud rates, others) to recommend the best possible model (from a list of production models) to serve back to the client to enable the client's automated binary decision. According to preferred embodiments, the system of the present invention is able to intelligently and in real time, assess models and clients' inputs and find the best model matches optimized on optimum fraud capture.

With regard to the above-discussed scores normalization model, rules output data, defining raw data generated from application of either of pending rules base 420 or active rules base 410 to incoming transaction data, may be adapted to produce normalized scoring thereof. This way, when either of such pending rules base 420 and active rules base 410 is applied to incoming transaction data, scoring resulting from receipt of such data may be presented without regard to a particular version of fraud scoring engine 300 that produced such scoring. The transaction data may comprise one or more features and/or elements of the exemplary call data of FIG. 2. In removing anomalies that might otherwise exist from running differing versions of fraud scoring engine 300, perceptibility and interpretation resulting from the normalization enhances the ease in decisionmaking for a given transaction.

Figure 6:
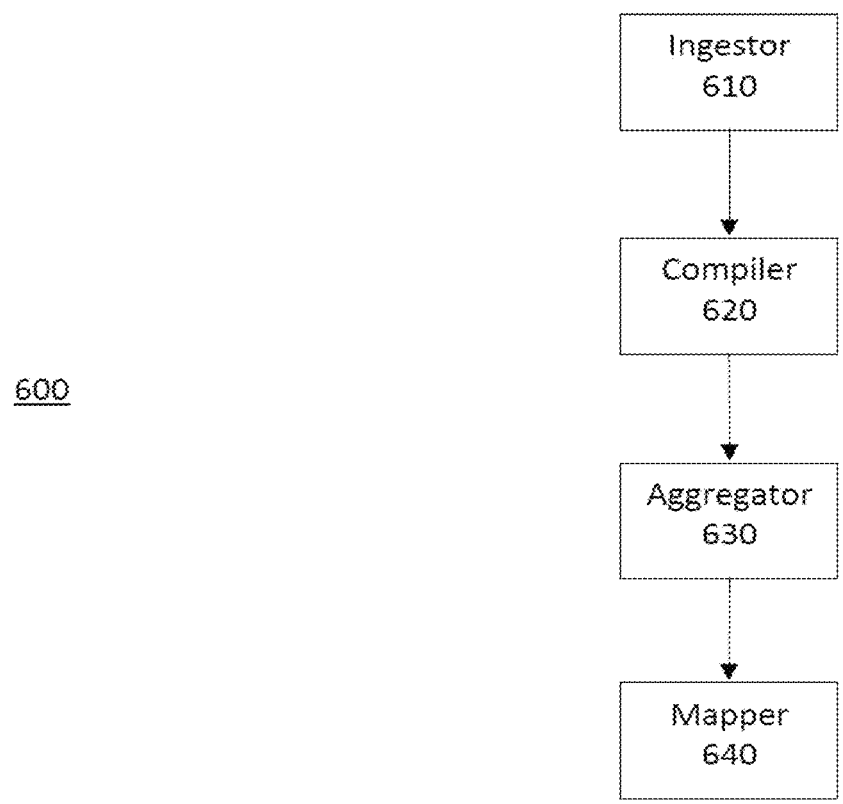
FIG. 6 is a diagram depicting components of the system of the present invention enabling transformation of data as between sets of data.

As such, and as is shown in FIG. 6, fraud scoring engine 300 may include a normalizer 600. The normalizer 600 may define each of an ingestor 610, a compiler 620, an aggregator 630, and a mapper 640, as are discussed in more detail below.

As has been demonstrated in connection with FIG. 5 above, the ratio of fraud scores indicating that fraud is or is not likely are not always indicative of an actual fraud outcome.

Thus, the normalization discussed herein contemplates adjusting raw scoring data to a prior probability therefor based on randomized sampling of a predetermined number of raw scores for a corresponding number of transactions for each of several clients of a given industry, e.g., banking. In doing so, the normalization may be particularized for a given industry according to a predetermined, adjusted expectation of the occurrence of fraud.

Relative to the randomized sampling and the number of transactions, the normalization herein may assess the corresponding Cumulative Distribution Function (CDF) at a predetermined number of points (x), each of which is indicative of a respective quantile (y), i.e., a value defining the probability that a magnitude of a given rules output data of the randomized sampling is less than a magnitude of the corresponding point. Thus, where each of such points x may be representative of a rules output data indicative of a raw fraud score, such score may quantified by the quantile such that $CDF(x)=y$. In this regard, each of such points x representing a rules output data may indicate one or more of random samplings of that data (across sampled clientele of a given industry) that adjust such data to a predetermined rate, i.e., percentage, of fraud occurrence. The quantiles may represent a given, predetermined number of bins into which adjusted rules output raw scores of the transactions may be grouped, and be predetermined based upon a normalization of those adjusted raw scores. The bins, i.e., quantile values, may each represent a degree of risk associated with an assigned lower bound for the rules output scores, as discussed below.

Figure 7:
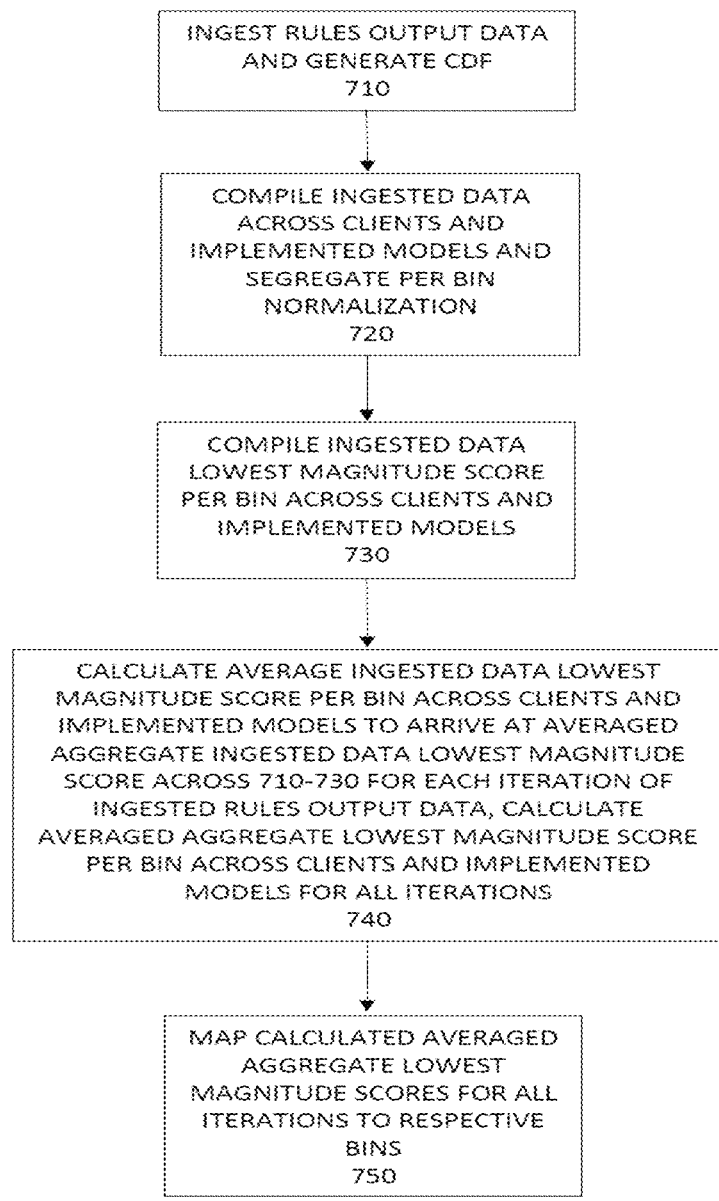
FIG. 7 is flow chart describing the key steps involved in the process implemented by the components of FIG. 6.

In these regards, and with reference to FIGS. 6 and 7, ingestor 610, at 710, ingests raw scores generated as, optionally, CDF rules output data, according to operation of pending rules base 420 or active rules base 410. The rules output data, as discussed, may be applicable to a predetermined number of clients in a given, common industry with respect to a predetermined number of transactions so as to define an iteration for ingestion. Ingestion may occur for a given, predetermined number of iterations. That is, collections of rules output data may be performed for a set, predetermined number of cycles, thus obtaining a desired level of granularity for a given quantile.

In these regards, the collections of rules output data can be derived from selective comparisons of rules output data of the pending rules base 420 to rules output data of the active rules base 410. To carry out the comparisons, model assessment module 340 can employ one or more machine learning models trained to identify occurrences of fraud (i.e., fraud bases) for transaction data fed to each of the pending rules base 420 and the active rules base 410. A "machine learning model" or "model" as used herein, refers to a construct that is trained using training data to make predictions or provide probabilities for new data items, whether or not the new data items were included in the training data. For example, training data for supervised learning can include positive and negative items with various parameters and an assigned classification. Examples of models include: neural networks (traditional, deeps, convolution neural network (CSS), recurrent neural network (RNN)), support vector machines, decision trees, decision tree forests, Parzen windows, Bayes, clustering, reinforcement learning, probability distributions, decision trees, and others. Models can be configured for various situations, data types, sources, and output formats.

The machine learning model can be trained with supervised learning and use training data that can be obtained from a history of transaction data (as defined by feedback data). More specifically, each item of the training data can include an instance of a prior transaction matched to one or more determinations (i.e. reasons) for a fraudulent occurrence. The matching can be performed according to a predetermined algorithm configured to receive transaction data from a historical record and pair it with results of analysis of the record, such as what types fraud occurred (e.g., improper PII, forged ID, etc.). During the model training, a representation of the transaction data (e.g., histograms of ID images, values representing PII, etc.) can be provided to the model (e.g., each as an element of a vector). Then, the output from the model, i.e., predicted fraudulent occurrence(s) from the model, can be compared to actual feedback for the transaction(s) and, based on the comparison, the model can be modified, such as by changing weights between nodes of the neural network or parameters of the functions used at each node in the neural network (e.g., applying a loss function). After applying each of the pairings of the inputs (prior transaction data) and the desired outputs (fraud bases for occurrences of fraud) in the training data and modifying the model in this manner, the model is trained to evaluate new instances of transaction data in order to determine fraud bases for transaction data. This way, FSS 100 can re-train existing rules or provide new rules for an appropriate pending rules base 420 based on the determined fraud bases.

Figure 7A:
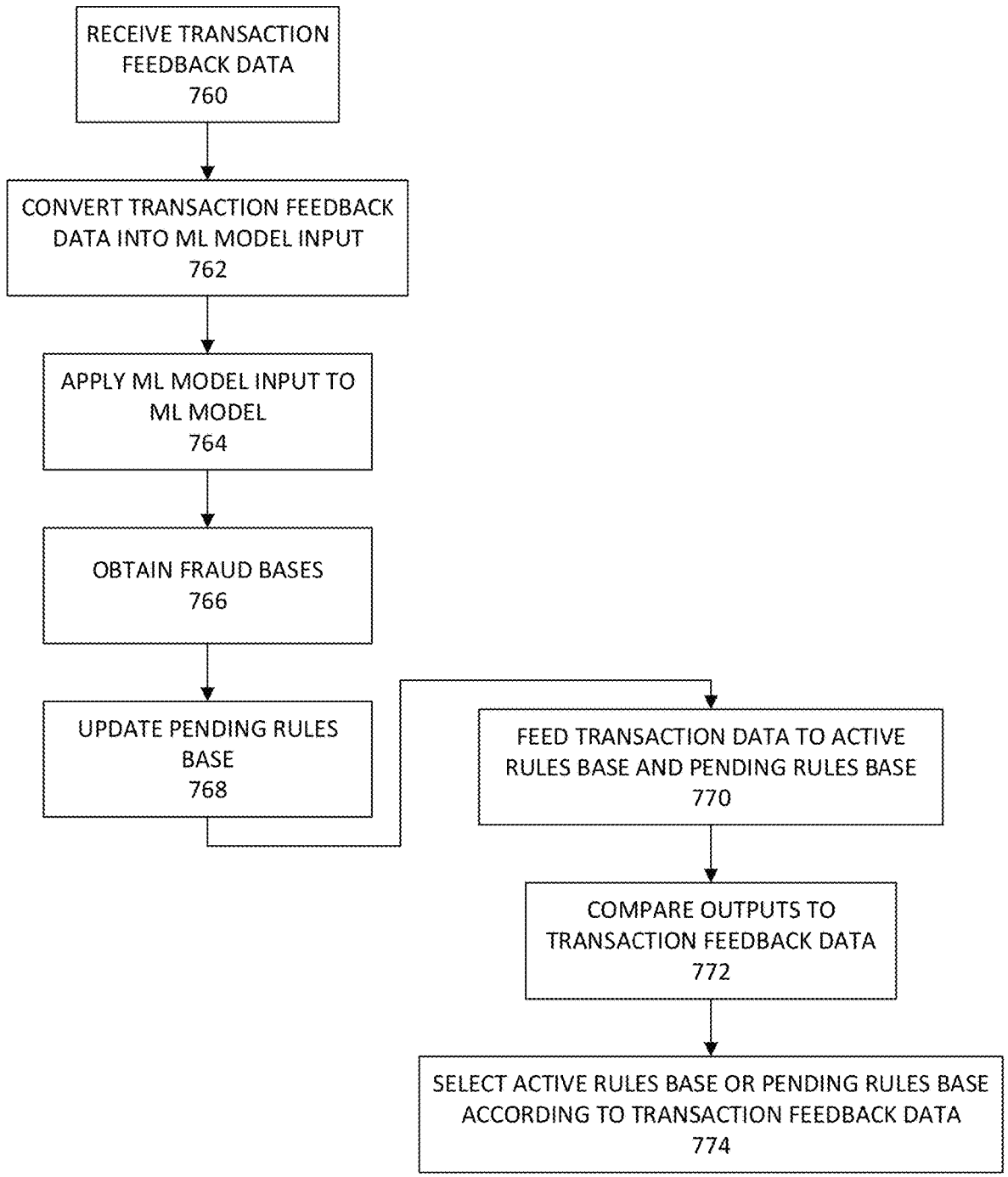
FIG. 7A is a flow chart describing a process for determining rules output data as bases for Cumulative Distribution Function (CDF) rules output data generated in FIG. 7.

In referring to FIG. 7A, there is shown a process for determining the rules output data that defines the CDF rules output data generated at 710 in FIG. 7. As such, the process of FIG. 7A can be understood as being performed as a sub-process of step 710 (i.e., the generation of scores for the CDF rules output data ingested at step 710).

At 760, FSS 100 can, for multiple (e.g., thousands of) transactions, receive transaction feedback data according to FIG. 5 with regard to respective requests for a fraud score. In this regard, FSS 100 can use the above-described referenceid to match feedback for corresponding independent variables implemented at an original time of a request. At 762, FSS 100 can convert the feedback data into machine learning model input. For example, the machine learning model according to model assessment module 340 can be configured to receive a sparse vector with vector slots filled by the various types of data received at 760. Values for various PII, for example, and indications whether the same were actually fraudulent can be entered into a vector that the machine learning model has been trained to receive. At 764, FSS 100 can apply the machine learning model input to the machine learning model that can be implemented by model assessment module 340. In response to application of the machine learning model input, FSS 100 can, at 766, obtain fraud bases for the received feedback data (e.g., types of error in PII such as incorrect address, email, etc.). Using the obtained fraud bases, FSS 100 can, at 768, then update pending rules base 420 to select or adjust corresponding ones of independent variables (i.e., rules) for which the fraud bases pertain. In this case, the selection or adjustment can be made according to a predetermined rules threshold where selection of a new rule or adjustment of an existing rule is performed in response to the feedback indicating that the absence of the new (candidate) rule or prior expression of the existing rule was, for example, at least 50% (or other predetermined percentage) responsible for an incorrect original fraud scoring. At 770, FSS 100 can feed the original transaction data corresponding to the received feedback to both the active rules base 410 and the pending rules base 420 (as updated). Resultingly, FSS 100 can then compare, at 772, respective outputs of each rules base relative to the feedback for the fed transaction data. This way, FSS can establish a comparative measurement, i.e., a determination of which rules base more proximately yielded the transaction result aligned with the transaction feedback according to the threshold, on which the active rules base 410 or the pending rules base 420 is selected, at 774, for future iterations of transaction data and fraud scoring requests.

In referring again to FIG. 7, once ingestion has occurred for a single iteration, the relevant raw scores are evaluated by compiler 620 at each quantile according to a generated CDF for a given client generated by ingestor 610, whereas the evaluations of the CDF comprise a first set of scores data. Thereafter, compiler 620 compiles, at 720, the ingested data across all clients being evaluated for a given industry and their implemented models such that the ingested data is segregated or sorted per the relevant bin normalization according to a magnitude of that data (see FIG. 8).

Now that the ingested data has been organized by the relevant bin for each client, compiler 620 further proceeds to, at 730, organize each client iteration to group the lowest magnitude score for each bin, i.e. lower bound (see FIG. 9).

Steps 710-730 may be repeated for each of predetermined sets of ingested rules output data so as to define multiple, predetermined iterations of ingested rules output data according to a CDF therefor.

Once each iteration is organized to collect the lowest magnitude score for each bin, aggregator 630 then, at 740, calculates, per iteration, an averaged aggregate lowest magnitude score, per bin, i.e., from among all the previously compiled lowest magnitude scores for the considered clients (see FIG. 10A). After calculating, aggregator 630 then arranges the calculated averages according to the appropriate bin (see FIG. 10B).

Figures 11A, 11B:
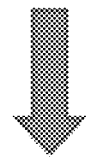
FIG. 11A illustrates a first chart, in accordance with FIG. 10B, including the calculated averaged aggregate lowest magnitude score, per bin, in the respective iteration, as well as a second chart similarly exemplary of determination of a calculated averaged aggregate lowest magnitude score, per bin, in another iteration across clients in accordance with calculations demonstrated by FIGS. 8-10B.
FIG. 11B illustrates a chart designating mapping bins containing calculated, averaged aggregate lowest magnitude scores among all clients, per bin, for all determined iterations.

In response to all iterations being completed, aggregator 630, at 740, further calculates, per bin, an averaged aggregate lowest magnitude score from among all the previously calculated averaged aggregate lowest magnitude scores for each iteration (see FIG. 11A). After calculating, aggregator 630 then arranges, i.e., maps, the calculated averages as a second set of scores data according to the appropriate bin, and designates each bin as a mapping bin (see FIG. 11B).

In these regards, the aforementioned mapping resulting from steps 710-740 may be generated iteratively and/or continuously as rules output data is received from one or more clients in a given industry. That is, steps 710-750 may, relative to receipt of sufficient data, be automatically triggered upon iterative receipt of such data so as to ensure timeliness and granularity for the mapping. This way, a correlation between a given quantile and scoring produced by FSE 300 may accurately and continuously account for feedback defining production of the rules output data.

The mapping may be periodically assessed to ensure statistical integrity, i.e., to ensure, as between data for several iterations, receipt of a sufficient volume of rules output data demonstrating a statistically acceptable margin of difference with respect to data for at least a preceding iteration.

Referring to FIGS. 8-11, there is illustrated a numerical representation of steps 710-750 so as to aid the reader in an understanding of how the rules output data and its formation of raw fraud scoring may be adapted via the normalization herein.

With respect to step 710 and FIG. 8, there is illustrated an array of rules output data corresponding to a group of clients including Client 1, Client 2, Client 3, and Client 4. For each client, 20 CDF rules output data scores are shown for 20 client transactions submitted to fraud scoring engine 300. In embodiments herein, it is to be understood that the rules output data may be derived from other than the CDF, such that the rules output data may be raw data, data derived from such raw data, and/or one or more combinations of raw data and data derived therefrom. Relative to the exhibited scores, bins are established per a predetermined manner of normalization, wherein the exhibited scores are ordered per bin.

With respect to step 720 and FIG. 9, each lower bound within each bin is identified per client and per bin. That is, with respect to, for example, Bin 0 of Client 1, data scores 0.0376; 0.1262; 0.1384; and 0.139 yield a Lower Bound of 0.0376.

With respect to step 730 and FIG. 10A, each bin lower bound is organized per client. For instance, and with respect to Client 1, Bin 0 corresponds to a Lower Bound of 0.0376, Bin 0.2 corresponds to a Lower Bound of 0.211, Bin 0.4 corresponds to a Lower Bound of 0.3426, Bin 0.6 corresponds to a Lower Bound of 0.6926, and Bin 0.8 corresponds to a Lower Bound of 0.8288.

With respect to step 740 and FIG. 10B, the sum of each bin lower bound across each of the clients being considered is calculated and averaged to arrive at an aggregate lower bound for each bin and for each iteration of ingested transaction records. For example, and with respect to Iteration 1, Bin 0, the following calculated, aggregate average Lower Bound of 0.04155 is determined from (0.0376+0.0119+0.0722+0.0445)/4.

With further respect to step 740, and after obtaining the lower bound for each iteration (as shown in FIG. 11A), such lower bounds are themselves summed and averaged to arrive at a mapping average Lower Bound according to, with respect to Bin 0, for example, the operation of (0.04155+0.06121)/2, so as to yield a fraud score magnitude of 0.05138 defining the lower bound of probability of fraud as a lowest fraud score that may be assigned to Bin 0, i.e., a percentage representing the degree of risk as to fraud. In other words, the magnitude of 0.05138 serves as a floor defining the lowest possible fraud score that is assignable to the zero (0) percentage fraud risk such that any score value above 0.05138 and below lower bound 0.1704125 (corresponding to Bin 0.2 in FIG. 11B) still qualifies as representing zero percentage fraud risk. However, in practice, embodiments herein contemplate overwriting value 0.05138 to be 0 such that scores occurring below such value are captured within the lowest risk percentage, i.e., initial bin or quantile. That is, in practice, embodiments herein contemplate maintaining a zero (0) value percentage risk which is to be correlated with a lowest, predetermined percentage risk value or quantile. In this way, such percentage risk value or quantile will include scoring between a zero (0) value and values less than a lowest bound value corresponding to the successively, higher risk percentage value or quantile. In the above example, such scoring would thus define a value less than 0.1704125.

Figure 12:
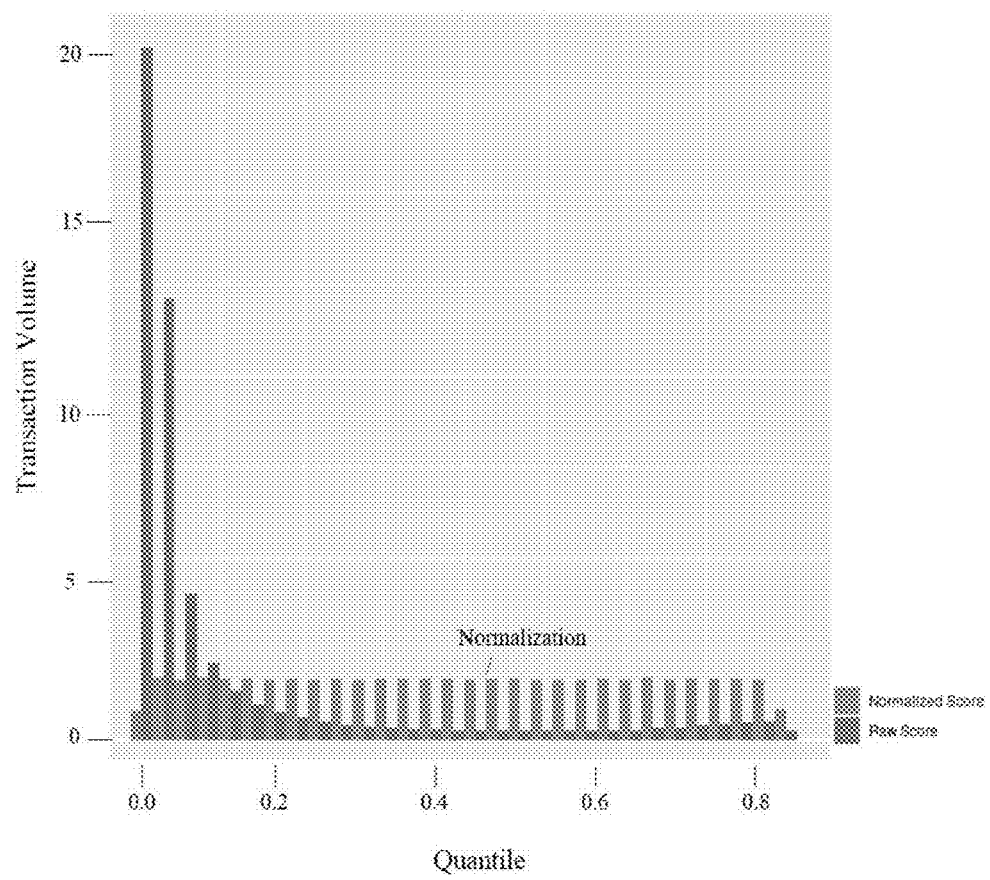
FIG. 12 is a chart depicting a representation of presentation of the transformation according to FIGS. 8-11.

In these ways, mapper 640 may, at 750, function to map the mapping average lower bounds in tabular form as is shown in FIG. 11B, or alternatively, in graphical form as is shown in FIG. 12. Therein, scores falling within quantiles may be related to those transaction records for which lower bounds were calculated.

Thus, as may be appreciated from the above, establishment of the lower bounds according to the normalization herein implicitly defines decisionmaking thresholds that correspond to an associated probability for fraud. That is, assignment of the lower bounds to correspondingly associated quantile, i.e., bin, values provides an established quantile to score correlation by which a client may judge the likelihood of fraud per the value of the quantile. For example, and whereas a quantile value of 0 represents an absence of the likelihood for fraud and a quantile value of 1 represents a certainty for fraud, assigned lower bound scores may be viewed as a minimally acceptable score that may be considered for a given fraud likelihood. Accordingly, the assigned lower bound scores may be employed to establish a paired correlation between a quantile and an actually reported fraud score, as generated by FSE 300, such that a respective lower bound score represents a lowest score value enabling association with such quantile, i.e., risk percentage.

Accordingly, the normalization herein may enable a presentation of fraud scoring, and other types of scoring, as may be applicable, that smoothens differences that might otherwise exist with respect to the input for that scoring. That is, scoring may be presented without regard to operation of the particular machine learning model, and input therefor, that produced it. Moreover, as is evident from the discussion herein demonstrating scoring results initially received from multiple ones of clients, such normalized presentation may adapt results outputted from one or more differing machine learning models.

In these ways, it may be appreciated that the normalization herein achieves a practical application of machine learning modeling, as well as significantly more than merely machine learning modeling and any categorization thereof.

Such application is evident in view of the ability to simultaneously process numerous (i.e., at least thousands of) sets of transaction data and associated feedback to fluidly adjust optimized application of rules to subsequently received requests for fraud scoring.

Such application is further evident in the transformation of raw scores data to a normalized representation thereof, without regard to the type or manner of machine learning modeling that produced such raw scores data. As such, the application enables receipt of data from varied clientele for a given industry. In this regard, the clientele are thus afforded the opportunity to receive normalized scoring without being burdened by the need to provide their raw scoring through a specialized machine learning model. That is, such model need not be specifically tailored for cooperation with the recipient that enacts the normalization herein and then returns the quantile to score correlation to a given client.

Still further, such application, inclusive of significantly more than mere machine learning operation, is provided based on heightened efficiency of operation of the computer operations enacting the normalization herein. Specifically, the aforementioned operations need not dedicate processing power and storage capacity otherwise necessary for raw scores depiction(s). Resultingly, such computer operations are enhanced as energy demand required for producing the normalization manifested by the aforementioned correlation is advantageously minimized.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A system for iteratively transforming transaction scores data to detect one or more fraudulent transactions from among transactions corresponding to received transaction data therefor, comprising:
  a fraud scoring engine comprising a physical storage and one or more processors for executing instructions, the instructions comprising
    at least a first instruction of the instructions defining an ingestor operative to receive a first set of the transaction scores data corresponding to a plurality of entities;
    at least a second instruction of the instructions defining a compiler operative to sort the first set of transaction scores data into a plurality of bins;
    at least a third instruction of the instructions defining an aggregator operative to
      identify a lowest magnitude portion of the first set of transaction scores data corresponding to each of the plurality of entities and each bin of the plurality of bins, and
      form the lowest magnitude portions of the first set of transaction scores data as a second set of the transaction scores data defining a normalization of the first set of transaction scores data; and
    at least a fourth instruction of the instructions defining a mapper configured to map the second set of transaction scores data to each bin of the plurality of bins,
  wherein
    the first set of transaction scores data is based on an application of a first rules base to the received transaction data, in response to the application of the first rules base, as against an application of a second rules base to the received transaction data, generating a highest correspondence between the first set of transaction scores data and feedback for the received transaction data,
    the transaction scores data of the first and second sets of transaction scores data defines a scoring of the received transaction data comprising a correlation to a probability of fraud as to one or more of the transactions corresponding to the received transaction data, and
    each of the first and second sets of transaction scores data are automatically generated, in sequence, for each of one or more iterations of the received transaction data corresponding to one or more of the plurality of entities.

2. The system of claim 1, wherein:
  each of the plurality of bins defines a quantile of a Cumulative Distribution Function (CDF) of the first set of transaction scores data.

3. The system of claim 2, wherein:
  the ingestor generates the CDF.

4. The system of claim 1, wherein:
  the second set of transaction scores data defines respective averages of the lowest magnitude portions corresponding to the plurality of entities and each bin of the plurality of bins.

5. The system of claim 1, wherein:
the first set of transaction scores data is generated by different machine learning models as between the plurality of entities.

6. The system of claim 5, wherein:
each of the plurality of entities corresponds to a common industry thereamong.

7. The system of claim 6, wherein;
each of the first and second sets of transaction scores data are based on the feedback data matching one or more variables of the received transaction data.

8. The system of claim 7, wherein:
each bin of the plurality of bins defines a quantile of a Cumulative Distribution Function (CDF) of the first set of the transaction scores data that defines a probability that the received transaction data underlying a respective score that is mapped to the quantile is fraudulent.

9. The system of claim 8, wherein:
a number of the plurality of bins is predetermined.

10. The system of claim 1, wherein:
said one or more fraudulent transactions comprise an application for one or more of (a) an account opening or an account information update, (b) a credit check, (c) a background check, (d) an employment verification, or (e) any combination thereof.

11. A computer-implemented method of iteratively transforming transaction scores data to detect one or more fraudulent transactions from among transactions corresponding to received transaction data therefor, the method being implemented in a computer system defining a fraud scoring engine comprising one or more processors configured to execute instructions stored on a non-transient computer-readable medium, the method comprising executing one or more of said instructions for:
receiving, at an ingestor defined by at least a first instruction of the instructions, a first set of the transaction scores data corresponding to a plurality of entities;
sorting, at a compiler defined by at least a second instruction of the instructions, the first set of transaction scores data into a plurality of bins;
identifying, at an aggregator defined by at least a third instruction of the instructions, a lowest magnitude portion of the first set of transaction scores data corresponding to each of the plurality of entities and each bin of the plurality of bins;
forming, at the aggregator, the lowest magnitude portions of the first set of transaction scores data as a second set of the transaction scores data defining a normalization of the first set of transaction scores data; and
mapping, at a mapper defined by at least a fourth instruction of the instructions, the second set of transaction scores data to each bin of the plurality of bins, wherein
the first set of transaction scores data is based on an application of a first rules base to the received transaction data, in response to the application of the first rules base, as against an application of a second rules base to the received transaction data, generating a highest correspondence between the first set of transaction scores data and feedback for the received transaction data,
the transaction scores data of the first and second sets of transaction scores data defines a scoring of the received transaction data comprising a correlation to a probability of fraud as to one or more of the transactions corresponding to the received transaction data, and
each of the first and second sets of transaction scores data are automatically generated, in sequence, for each of one or more iterations of the received transaction data corresponding to one or more of the plurality of entities.

12. The method of claim 11, wherein:
each of the plurality of bins defines a quantile of a Cumulative Distribution Function (CDF) of the first set of transaction scores data.

13. The method of claim 12, further comprising:
generating the CDF at the ingestor.

14. The method of claim 11, wherein:
the second set of transaction scores data defines respective averages of the lowest magnitude portions corresponding to the plurality of entities and each bin of the plurality of bins.

15. The method of claim 11, wherein:
the first set of transaction scores data is generated by different machine learning models as between the plurality of entities.

16. The method of claim 15, wherein:
each of the plurality of entities corresponds to a common industry thereamong.

17. The method of claim 16, wherein;
each of the first and second sets of transaction scores data are based on feedback data matching one or more variables of the received transaction data.

18. The method of claim 17, wherein:
the matching of the feedback data to the one or more variables of the received transaction data is determined in accordance with application of a first rules base to each of the feedback data and the received transaction data, in response to a determination that the first rules base more accurately reflects the feedback data when evaluating the matching.

19. The method of claim 18, wherein:
each bin of the plurality of bins defines a quantile of a Cumulative Distribution Function (CDF) of the first set of transaction scores data that defines a probability that the received transaction data underlying a respective score that is mapped to the quantile is fraudulent.

20. The method of claim 19, wherein:
a number of the plurality of bins is predetermined.

21. The system of claim 11, wherein:
said one or more fraudulent transactions comprise an application for one or more of (a) an account opening or an account information update, (b) a credit check, (c) a background check, (d) an employment verification, or (e) any combination thereof.

22. A system for iteratively transforming transaction scores data to detect one or more fraudulent transactions from among transactions corresponding to received transaction data therefor, comprising:
a physical storage and one or more processors for executing instructions being stored within the physical storage and comprising
generating an active rules base;
scoring the received transaction data according to the active rules base to define the transaction scores data;
receiving a first set of the transaction scores data corresponding to a plurality of entities;
generating a second set of the transaction scores data based on a normalization of lowest magnitude portions of the first set of the transaction scores data; and
mapping the second set of the transaction scores to bins corresponding to the first set of the transaction scores data, wherein
- each of the first and second sets of transaction scores data are automatically generated, in sequence, for each of one or more iterations of the received transaction data corresponding to one or more of the plurality of entities.

23. The system of claim 22, wherein:
- said one or more fraudulent transactions comprise an application for one or more of (a) an account opening or an account information update, (b) a credit check, (c) a background check, (d) an employment verification, or (e) any combination thereof.

24. The system of claim 23, wherein:
- the generating the active rules base comprises applying previously received transaction data to at least a pair of rules bases to obtain respective scores for the previously received transaction data according to the applications.

25. The system of claim 24, wherein:
- the generating the active rules base further comprises comparing the respective scores for the previously received transaction data to feedback corresponding to the previously received transaction data.

26. The system of claim 25, wherein:
- the generating the active rules base further comprises selecting one of the at least a pair of rules bases yielding a score having a highest correspondence to the feedback corresponding to the previously received transaction data as the active rules base.

27. The system of claim 26, wherein:
- the highest correspondence is measured against a predetermined threshold.

* * * * *